(12) United States Patent
Fukushima

(10) Patent No.: US 6,713,924 B1
(45) Date of Patent: Mar. 30, 2004

(54) BRUSHLESS MOTOR HAVING ISOSCELES SIDED STATOR COILS AND POSITION DETECTION CAPABILITY

(75) Inventor: Shinji Fukushima, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/701,226

(22) PCT Filed: Mar. 29, 2000

(86) PCT No.: PCT/JP00/01925

§ 371 (c)(1),
(2), (4) Date: Feb. 9, 2001

(87) PCT Pub. No.: WO00/60726

PCT Pub. Date: Oct. 12, 2000

(30) Foreign Application Priority Data

Mar. 31, 1999 (JP) ............................................. 11-092585

(51) Int. Cl.[7] ............................ H02K 1/00; H02K 3/00; H02K 17/00; H02K 19/00; H02K 21/00
(52) U.S. Cl. ..................... 310/179; 310/208; 310/159; 310/160; 310/161; 310/162; 310/163; 310/164
(58) Field of Search ................. 310/159–164, 310/179, 208

(56) References Cited

U.S. PATENT DOCUMENTS 5,124,604 A 6/1992 Swartz .................... 710/68 B

FOREIGN PATENT DOCUMENTS

| JP | S48-43109 | 6/1973 |
| JP | 56-166759 | 12/1981 |
| JP | S58-115887 | 8/1983 |
| JP | 64-47252 | 2/1989 |
| JP | 57-163185 | 2/1989 |
| JP | 1-315244 | 12/1989 |

Primary Examiner—Pedro J. Cuevas
Assistant Examiner—Nicholas Ponomarenko
(74) Attorney, Agent, or Firm—RatnerPrestia

(57) ABSTRACT

A three-phase brushless motor includes a rotor with a permanent magnet having P (P is an integer not less than two) polarities and a stator facing the rotor and having plural coils shaped in approx, triangle or trapezoid. A space between adjacent coils is (360/P)×(5/3) degree. Three position-detectors, which detect the position of the rotor, is placed at intervals of (360/P)×(2/3) degree in an area where no coils are placed. This structure allows the coils to be optimally shaped and placed, and realizes to reduce a number of coils as well as improve the motor characteristics.

5 Claims, 3 Drawing Sheets

BRUSHLESS MOTOR HAVING ISOSCELES SIDED STATOR COILS AND POSITION DETECTION CAPABILITY

THIS APPLICATION IS A U.S. NATIONAL PHASE APPLICATION OF PCT INTERNATIONAL APPLICATION PCTJP00/01925.

TECHNICAL FIELD

The present invention relates to a three-phase brushless motor, and more particularly it relates to a placement of stator coils of the motor.

BACKGROUND ART

A brushless motor (hereinafter referred to as a motor) has been required to have greater motor-constant "Kt" representing the torque generated per unit-electric-current in order to output greater power. For getting the greater motor-constant "Kt", in general, winding-coils are disposed occupying an area equal to or more than an area occupied by permanent magnets (hereinafter referred to as a magnet) in a disc-shaped rotor. Then a number of coils "S" increases or a number of turns of each coil increases. In this case, however; if a stator is formed by disposing flat-coreless-coils on a printed circuit board, the motor becomes expensive and incurs low productivity because the cost of manufacturing equipment rises and a number of processes increase.

When motors are downsized, the area to be occupied by a bundle of winding of the coil naturally decreases. Thus the number of turns of the coil cannot be increased As a result, the motor constant cannot be greater. This problem provides users with the following alternative: One is just to persuade oneself that the downsizing of the motor entails the smaller motor constant, the other is to change windings and magnets to ones of higher performance and more expensive so that the influence, due to downsizing the motor, decreasing the motor constant can be minimized.

FIG. 2A through FIG. 2C show a conventional facing and flat three-phases brushless motor. Meanwhile, the facing and flat type is referred to as a motor structure where a rotor faces a stator via a spacing in the axial direction.

In FIG. 2B, a size of the motor is represented by diameter "OD" extending between an outer rim of a group of the coils. When diameter "OD" measures ca. 40 mm, another diameter "ID" extending between an inner rim of the group of the coils measures ca. 20 mm. In many cases, nine coils are employed by considering the balance between the radial length and circular length of the coil. In this case, since the number of polarities "P" of the disc-shaped rotor shown in FIG. 2C is 12, the fan-shaped polarity forms an angle of 30° based on 360/P. The coils are arranged as shown in FIG. 2B, i.e. respective coils are spaced at intervals of 360/9=40°. Thus the space between each coil is 4/3 of the width of the polarity. In other words, the relation (coil placement condition) between the polarity width and the space between each coil is expressed as (360/P)×(4/3), with considering a placement of the polarities. Thus in this case, 40 degree interval is calculated.

In FIG. 2B, respective coils forming U, V and W phases are placed. U phase is formed by coils U1, U2 and U3. V phase is formed by coils V1, V2 and V3. W phase is formed by coils W1, W2 and W3. Nine coils in total are disposed on printed circuit board 2. Width "A" of winding-bundle of each coil is restricted by soldering land 4 and the adjacent coils. The soldering land 4 is disposed inside of each coil and used for terminating the coil-wire end.

Each coil, in particular, comprises numbers of winding-bundles, therefore, 0.01 mm dispersion of winding diameter causes 0.2 mm dispersion on coil's outer diameter when the winding turns 20 ties. This dispersion and the work of fixing each coil onto the printed circuit board should be taken into consideration, the space to the adjacent coils thus should be ca. 1 mm in general. Further, another space is required for disposing magnetic sensor 5—a position detector—for detecting a rotor position. Sensors 5 are placed inside respective three coils, i.e. coils U1, V1 and W1. The width "A" of winding-bundle of these three coils thus become narrower than those of other 6 coils. This restriction reduces a number of turns of these three coils, and prevents the motor constant from becoming greater. The size of the magnetic sensor and the area of the soldering land are difficult to be reduced in proportion to downsizng the motor, therefore, the influence of this restriction adversely increases more than proportional at greater downswing of the motor.

When an isosceles angle of the coil matches up to 30 degree which the rotor polarity forms, windings of the coil outwardly bulge out by ca. 1.7 mm on each side, and inwardly bulge out by ca. 0.9 mm on each side. When the space between the adjacent coil is considered, there is little space for disposing the winding outside the isosceles angle 30 degree. Therefore, if the number of turns of the coil should be increased, almost of all the windings should be disposed inside the angle 30 degree. As a result, the isosceles angle becomes practically less than 30 degree.

As such, in the case that the isosceles angle becomes smaller, one of a rotor polarity reaches the position, in a winding-bundle of one of isosceles sides, where the maximum torque is produced, then the other rotor polarity is displaced from the position, in another winding-bundle of the other side of isosceles sides, where the maximum torque would be produced. Therefore, as one entire coil, this coil cannot produce the maximum torque. As a result, the motor constant becomes smaller than the case where the isosceles angle forms 30 degree.

In the case that much more coil's windings are disposed inside of polarity angle 30 degree, a point, where torque is produced in a direction reverse to normal rotating direction of the motor, is provided, so that the motor constant incurs some loss. This reversal point also causes vibration of the motor.

FIG. 2A illustrates this situation. FIG. 2A shows a relation between cross section of winding-bundle of the coil and a position of the rotor shown in FIG. 2B. Coil's winding-bundles 8 and 9 are disposed with respect to polarity 7 disposed every 30 degree in rotor 6. Winding-bundles 8 and 9 form the same windings, and e.g. when electric current runs from this side to that side in bundle 8, the current runs from that side to this side in bundle 9. In other words, when different polarities face bundles 8 and 9 respectively, torque is produced in the same direction respectively; however, when the same polarities face bundles 8 and 9, torque is generated in the reverse direction and cancels each other. As shown in FIG. 2A and FIG. 2B, numbers of windings are disposed inside the 30 degree, and in this case, when rotor 6 revolves and polarity 7 reaches the position shown in FIG. 2A, Z-section of bundle 9 faces the same polarity of bundle 8. Thus reverse torque is produced in the same bundle 9.

The following prior art has been known for addressing the problem discussed above: Sensors 5 are collected and placed in the area where the coils are not disposed, as shown in FIG. 3. The coils are placed at conventional intervals of (360/P)×(4/3). For instance, 10 polarities with 6 coils can improve the problematic situation. In FIG. 3, based on the conventional coil placement condition discussed above, respective oils forming U, V and W phases are placed at intervals of 48 degree because of P=10. In other words, U phase coils are formed by coils U1 and U2, V phase coils are formed by coils V1 and V2, and W phase coils are formed by coils W1 and W2. In total 6 coils are disposed on the printed circuit board.

These 6 coils are massed in five areas disposed in every 48 degree, i.e. total area covered by 48×5=240 degree, so that the space for accommodating sensors 5 can be obtained. Sensors 5 can be placed at intervals of (360/P)×(4/3) degree or (360/P)×(2/3) degree. The example shown in FIG. 3 shows the interval of (360/P)×(2/3) degree i.e. 24 degree.

However, when diameter "OD", extending the outer rim formed by each coil, is small, soldering lands 3 outside the respective coil-wire ends become closer to sensor 5. Thus when the end of each coil-wire is soldered, the coil-wire end tends to short with the terminal of sensor 5. The coil-wire end is, in particular, easy to be deformed so that it is difficult to regulate its position during the work, and the disperse of length of coil-wire end is large due to terminating work, thus the coil-wire ends need, in general, a rather longer length preliminarily. Soldering lands 3 are placed on printed circuit board 2; however, the manufacturing technique allows rather great disperse on positional accuracy of lands 3, so that ca. 0.2 mm relative displacement with sensor 5 should be allowed. Due to the reasons discussed above, enough space between land 3 and sensor 5 is needed Therefore, when diameter "OD" is small, sensors 5 cannot be massed outside the coils, and they should be placed inside the coils instead.

In the case of the conventional motor discussed above and whose diameter "OD" is not more than 40 mm, spaces for respective coils should be small. Further, the number of turns of the coils are difficult to increase because the space for the soldering lands and the magnetic sensors should be reserved as well as good workability should be prepared. As a result, the motor constant cannot be greater. On the contrary, the motor constant decreases more than proportional at greater downsizing of the motor when the area ratio is considered between coils' occupying area vs. the area occupied by the magnetic sensors besides considering the dimensionally restricted soldering lands.

Other problems have been already discussed: i.e. the isosceles angle of the coil is practically smaller than the fan-shaped isosceles angle that forms the rotor polarity, so that the torque generated incurs some loss, and reverse torque is produced to counteract the torque and cause vibration of the motor.

DISCLOSURE OF THE INVENTION

The present invention addresses the problems discussed above, and a brushless motor of the present invention comprises the following elements:

a rotor with a permanent magnet having "P" (P is an integer equal to two or more than two) pieces of polarity; and a stator facing the rotor and having a plurality of coils. The coil has isosceles sides which interlink with the magnetic field produced by the polarities, and extension lines of the isosceles sides—extending through centers of winding-bundles of the coil—toward a shaft center cross each other at the shaft center and form an angle of 360/P degree.

This structure restrains the lowering of a motor constant due to downsizing the motor. Further, an optimum shape and optimum placement of the coils allow a number of coils to be reduced from the same size of the motor.

DETAILED DESCRIPTION OF THE PREFERRED EMBODIMENT

An exemplary embodiment of the present invention is demonstrated hereinafter with reference to the accompanying drawings.

Figure 1A:
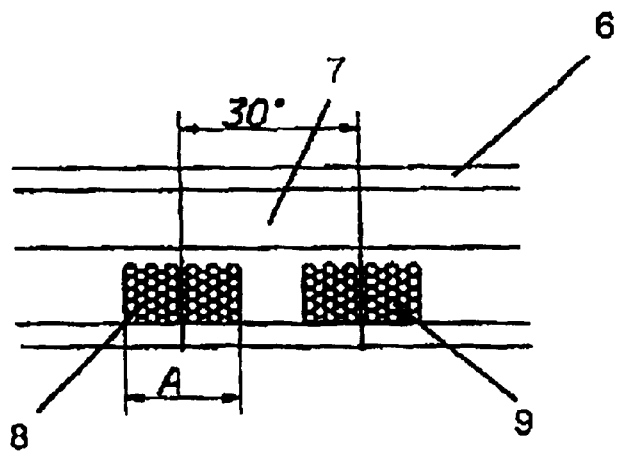
FIG. 1A is a cross section illustrating the relation between rotor's position and winding-bundles of a brushless motor in accordance with an exemplary embodiment of the present invention.
Figure 1B:
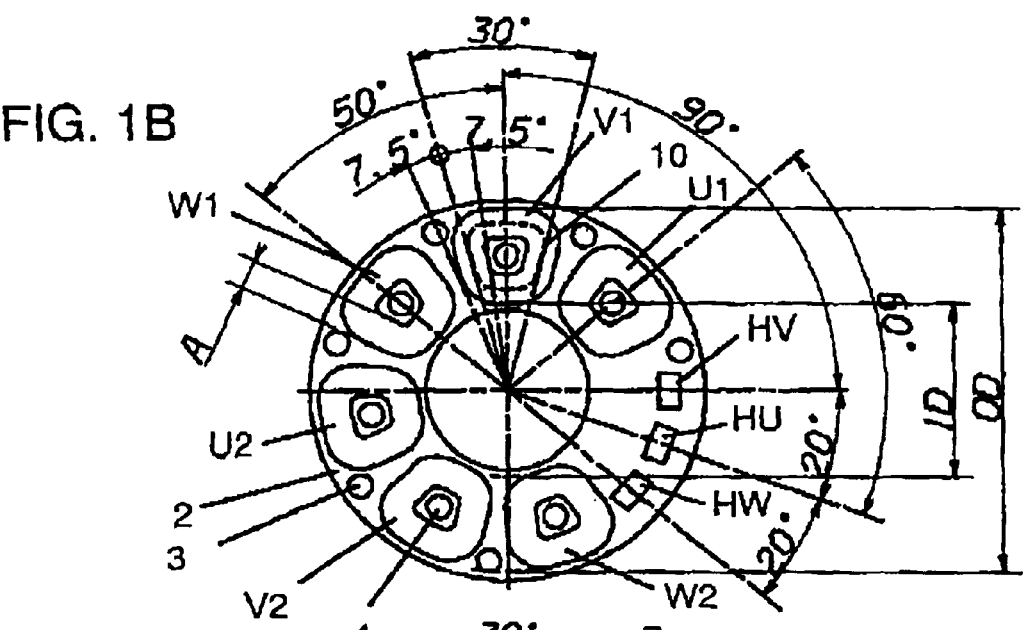
FIG. 1B shows a stator of the brushless motor in accordance with the exemplary embodiment of the present invention.
Figure 1C:
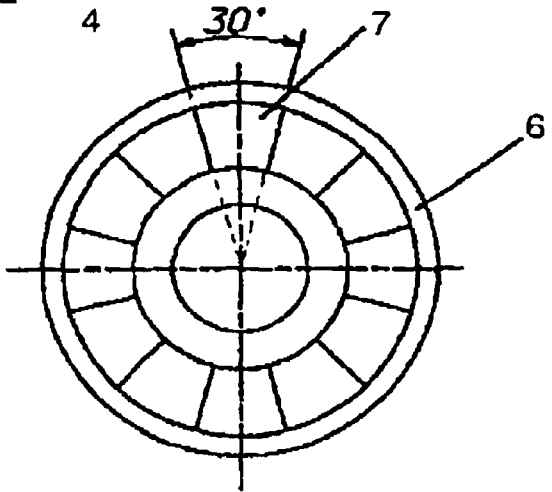
FIG. 1C shows a rotor of the brushless motor in accordance with the exemplary embodiment of the present invention.
Figure 2A:
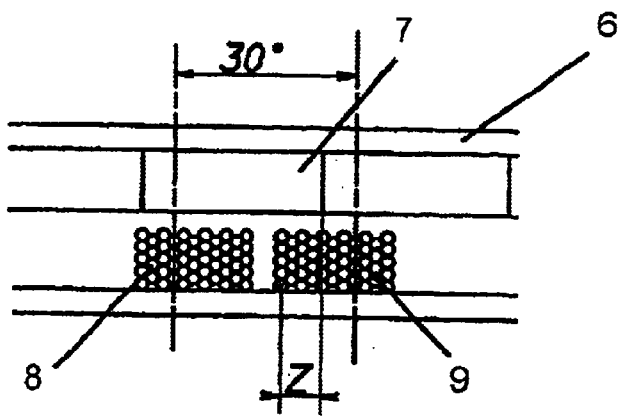
FIG. 2A is a cross section illustrating the relation between rotor's position and winding bundles of a conventional brushless motor (12 polarities and 9 oils).
Figure 2B:
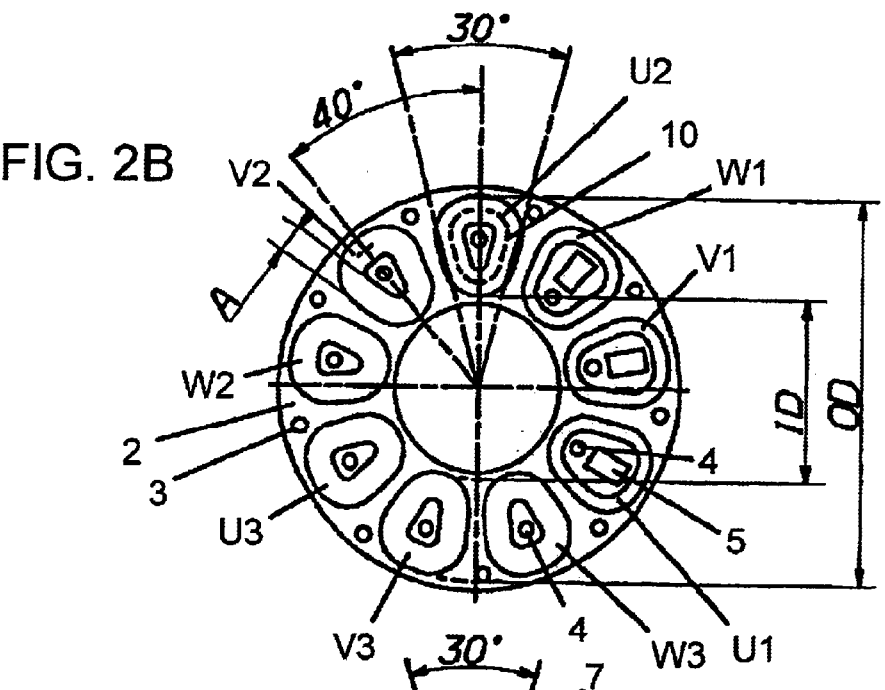
FIG. 2B shows a stator of the conventional brushless motor.
Figure 2C:
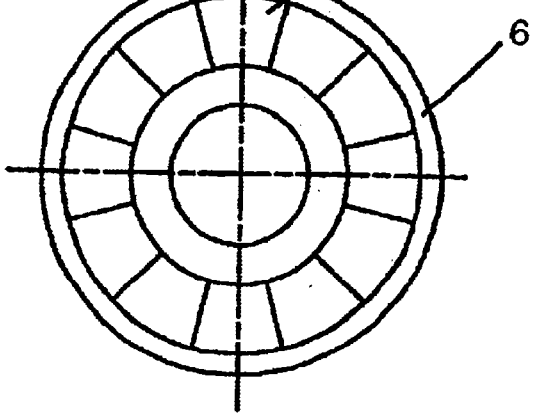
FIG. 2C shows a rotor of the conventional brushless motor.
Figure 3:
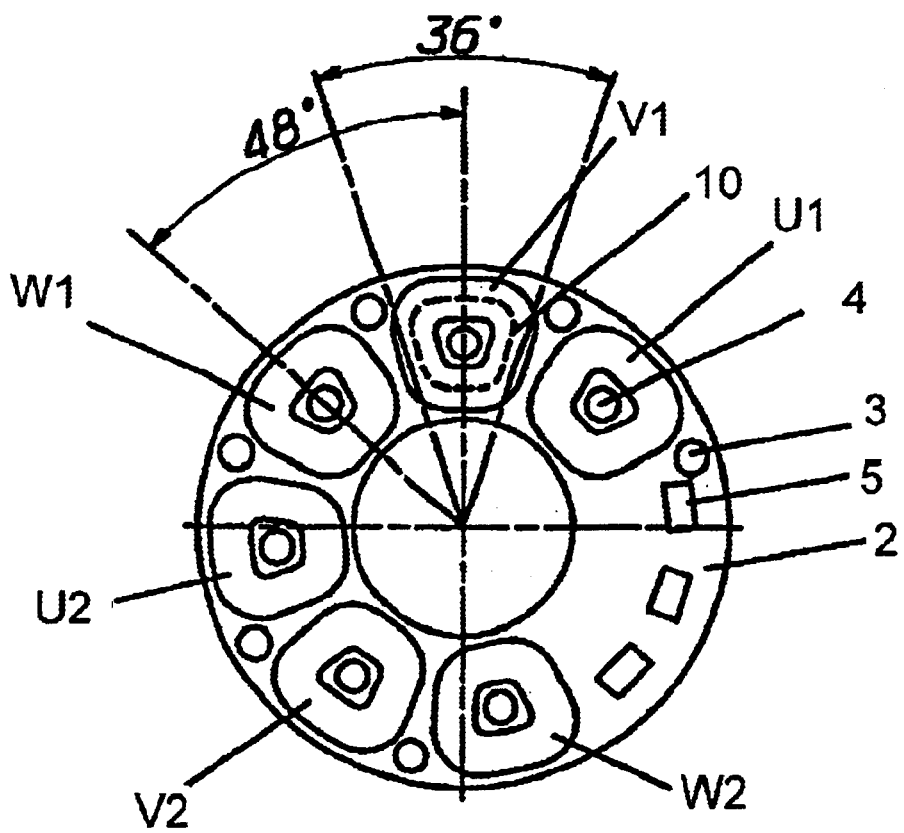
FIG. 3 shows a stator of another conventional brushless motor (10 polarities and 6 coils).

The exemplary embodiment is demonstrated with reference to FIGS. 1A, 1B and 1C.

FIG. 1A is a cross section illustrating the relation between rotor's position and winding-bundles of a brushless motor in accordance with the exemplary embodiment of the present invention. FIG. 1B shows a stator of the same brushless motor, and FIG. 1C shows a rotor of the same brushless motor.

FIG. 1A through FIG. 1C illustrate that the present invention reduces 9 coils conventionally required to 6 coils which are employed in a three-phase brushless motor having 12 rotor-polarities (P) and the diameter measures ca. 40 mm. Each coil is formed by flat coreless windings and preferably shaped in roughly a triangle or a trapezoid. The rotor is shaped in a disc.

As shown in FIG. 1B, respective coils forming U-phase, V-phase and W-phase are placed at intervals of (360/P)×(5/3) degree. Since P=12, the interval is calculated to be 50 degree. In other words, U-phase is formed by coils U1 and U2, V-phase is formed by coils V1 and V2, and W-phase is formed by coils W1 and W2. As such, three phases of the stator are formed by two coils of respective phases. The above formula thus results in 50 degree interval.

As shown in FIG. 1B, the coil winding-bundle forming isosceles sides of coil V1 is placed with respect to the one of angle sides forming 360/P degree so that one of the isosceles sides and the other side are placed within 360/(4× P) degree both inside and outside of the angle side. In the case of P=12, angle sides-extending through the center of two winding-bundles of a coil-form 30 degree. Each winding-bundle is placed within 7.5 degree inside and outside the angle side as a center.

Thus, for instance, in the case of the motor having diameter OD of ca. 40 mm, diameter ID is, in general, ca. 20 mm due to structural restriction by bearings and the like. In this case, when the isosceles sides of each coil form 30 degree, the windings piled up from the bundle center measures 3.5 mm width on both sides at the outer rim ($\phi$40) and 1.7 mm width on both sides at the inner rim ($\phi$20). This structure allows the windings to be placed outside the angle of 30 degree with enough space even if the clearance between the adjacent coil is reserved.

When six coils are arranged at intervals of 50 degree, the area where no coils are placed extends over 60 degree (in this embodiment, the area extends 65 degree.) In this area, three magnetic sensors HU, HV, HW, which are position detectors of the rotor, are placed at intervals of (360/P)×(2/3) i.e. 20 degree. This structure allows the place for respective coils to be larger than the case where the magnetic sensors are placed within the coils.

Relations of physical placement between the three phase coils and three position detectors are further detailed hereinafter with reference to FIG. 1B. The stator coil comprises three phases, namely, U-phase, V-phase and W-phase. Each phase is formed by coils U1 and U2 coupled in series, V1 and V2 coupled in series, W1 and W2 coupled in series. The center of coil U1 is spaced out from position detector HU by 60 degree. In the same manner, the center of coil V1 is way from position detector HV by 90 degree, and the center of coil W1 is away from detector HW by 180 degree. Respective detectors are arranged at intervals of 20 degree.

The structure of the three-phase motor in accordance with the embodiment practically makes the three-phase motor operative as same as the conventional brushless motor. This is demonstrated hereinafter.

In the conventional motor, with respect to a signal detected in a U-phase oil, a signal detected in a V-phase coil is shifted by 240 degree in electrical angle. With respect to the signal detected in the V-phase coil, a signal detected in a W-phase coil is shifted by also 240 degree in electrical angle. Thus the signal in the W-phase coil is shifted from the signal in the U-phase coil by 480 electrical angle; however a shift by 360 electrical angle is identical to the same phase, thus the signal in the W-phase coil is eventually shifted from that in the U-phase coil by 120 electrical angle. The detected signals in the three phases are shifted by 120 electrical angle respectively. This is the condition for the three-phase brushless motor to function.

On the other hand, in the brushless motor of the present invention, with respect to a signal detected in coil U1, a signal detected in coil V1 is shifted by 300 degree in electrical angle. With respect to the signal detected in coil V1, a signal detected in coil W1 is shifted by 300 electrical angle. As a result, the signal detected in coil W1 is shifted from that in coil U1 by 600 electrical angle. Since the shift of 360 electrical angle turns out the same phase, the signal in coil W1 is eventually shifted from the signal in coil U1 by 240 electrical angle. If coil W1 is shifted from coil U1 by 480 degree as same as the conventional motor, the three-phase brushless motor of the present invention satisfies the condition for functioning as the motor; however, the shift value is 300 degree. This does not allow this motor to function as the motor. Then the winding of coil V1 is wound in the opposite direction to that of coil U1, thereby shifting coil V1 from coil U1 by 180 electrical angle. As a result, coil V1 is shifted from coil U1 by 480 degree.

With respect to coil U1, coil U2 is shifted by 150 degree in mechanical angle, that means the shift amount is 900 degree in electrical angle. Since 360 degree shift in electrical angle is equivalent to the same phase, coil U1 has 180 degree phase difference in electrical angle from coil U2. Therefore, the winding of coil U2 is wound in the opposite direction to that of coil U1 so that coils U1 and U2 can be in the same phase in electrical angle.

In the same manner, coils V1 and V2, coils W1 and W2 are shifted by 150 degree in mechanical angle respectively. Thus the winding of one of the coils is wound in the opposite direction to that of the other, so that both the coils in respective cases are in the same phase in electrical angle. In other words, three windings of coils U2, V1 and W2 are wound in the opposite directions to those of coils U1, V2 and W1, so that the signals of respective coils of three phases are shifted by 120 electrical angle from each other. As a result, this motor can function as a three-phase brushless motor.

The effect discussed above can be realized also by changing a coupling direction between respective coils through wiring the printed circuit board, instead of changing the winding direction of the coil.

As discussed above, the structure of the brushless motor of the present invention allows the coils to be disposed at optimal places and shaped in an optimal form, so that loss of a motor constant is restrained. In the attempt at downsizing a motor, the loss of the motor constant due to restriction of placing coils can be reduced, thereby increasing the motor constant. Further, a number of coils can be reduced, thauks to the optimal placement and optimal shape of the coils, from the conventional motor of the same size.

Industrial Applicability

The present invention relates to coil placement in a stator applicable to a brushless motor. It be more specific, it relates to a three-phase brushless motor comprising a rotor with a permanent magnet having P pieces of polarity and a stator facing the rotor and coming with a plurality of coils forming approx. triangles or trapezoids. In this three-phase brushless motor, space between adjacent coils measures (360/P)×(5/3) degree, and three position detectors for detecting the position of the rotor are placed at intervals of (360/P)×(2/3) degree. The detectors are placed in the area where no coils are disposed. This structure allows the coils to be optimally placed and shaped in optimal form, and also realizes to reduce a number of coils as well as increase a motor constant.

What is claimed is:

1. A brushless motor comprising:

a rotor with a permanent magnet having P (P Is an integer not less than two), wherein two extension lines, which extend toward a shaft center of said rotor along both ends of each magnetic polarity of said rotor, form an angle with respect to the shaft center of said rotor; and a stator facing said rotor and having a plurality of coils, wherein any one of the coils has winding-bundles including isosceles sides interlinking with a magnetic field generated by the magnetic polarities, wherein two extension lines extending along centers of the winding-bundles of the isosceles sides of the coil cross each other at the shaft center of said rotor and form a vertex angle of 360/P degrees, and wherein the vertex angle formed by the two extension lines extending along centers of the winding bundles is equal to the angle formed by the two extension lines extending along both ends of the each magnetic polarity of said rotor.

2. The brushless motor as defined in claim 1, wherein an outer rim of the coil measures not more than ϕ40 mm.

3. The brushless motor as defined in claim 1, wherein the coli winding-bundles forming the isosceles sides are disposed within an area covered by an angle of 360/(4×P) degree both inside and outside with respect to a center of the angle of 360/P degree.

4. The brushless motor as defined in claim 3, wherein the coils adjacent to each other are spaced out at intervals of (360/P)×(5/3) degree.

5. The brushless motor as defined in claim 4 further comprising three position detectors for detecting a position of said rotor, wherein said detectors are placed at intervals of (360/P)×(2/3) degree and in an area where the coils are not placed.

* * * * *

UNITED STATES PATENT AND TRADEMARK OFFICE
CERTIFICATE OF CORRECTION

PATENT NO. : 6,713,924 B1
DATED : March 30, 2004
INVENTOR(S) : Fukushima

It is certified that error appears in the above-identified patent and that said Letters Patent is hereby corrected as shown below:

<u>Title page,</u>
Item [56], References Cited, U.S. PATENT DOCUMENTS, insert
-- 6,384,498 B1 5/2002 Yamaguchi et al.
   6,051,900     4/2000 Yamaguchi
   4,490,635   12/1984 Harrison et al.
   4,568,847    2/1986 Schmider
   4,578,606    3/1986 Welterlin
   4,633,149   12/1986 Welterlin
   4,634,912    1/1987 Heyraud
   4,644,157    2/1987 Ozawa et al.
   4,677,332    6/1987 Heyraud
   5,099,162    3/1992 Sawada
   5,608,278    3/1997 Mey et al.
   5,731,649    3/1998 Caamaño
   5,774,896    4/1998 Kessinger, Jr. et al.
   5,892,307    4/1999 Pavlovich et al.
   5,982,070  11/1999 Caamano
   6,011,337    1/2000 Lin et al.
   6,040,650    3/2000 Rao --.
FOREIGN PATENT DOCUMENTS, insert
-- JP  3-285547   12/1991
   JP  3-212146    9/1991
   JP  6-315254   11/1994
   JP  9-172762    6/1997
   JP  10-243621  9/1998 --.

Item [57], ABSTRACT,
Line 4, "approx," should read -- approx. --

<u>Column 6,</u>
Line 55, "Is" should read -- is --.

UNITED STATES PATENT AND TRADEMARK OFFICE
CERTIFICATE OF CORRECTION

PATENT NO. : 6,713,924 B1
DATED : March 30, 2004
INVENTOR(S) : Fukushima

It is certified that error appears in the above-identified patent and that said Letters Patent is hereby corrected as shown below:

<u>Column 7,</u>
Line 11, "coli" should read -- coil --.

Signed and Sealed this

Fifteenth Day of February, 2005

JON W. DUDAS
*Director of the United States Patent and Trademark Office*